April 13, 1926. 1,580,182
E. H. VAN VALKENBERG
DIRIGIBLE AIRSHIP
Filed April 27, 1925   5 Sheets-Sheet 2

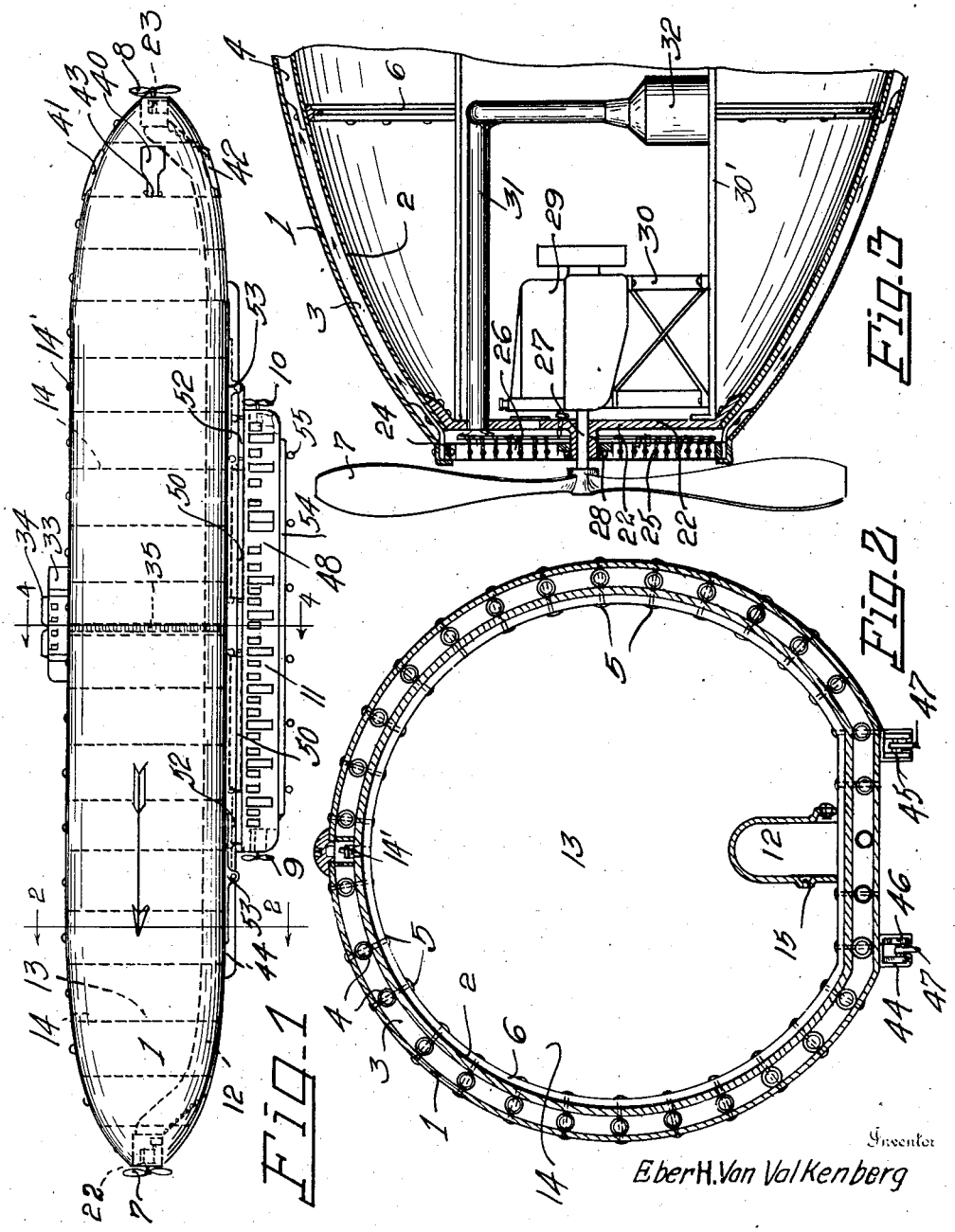

Inventor
Eber H. Van Valkenberg
By Herbert E. Smith
Attorney

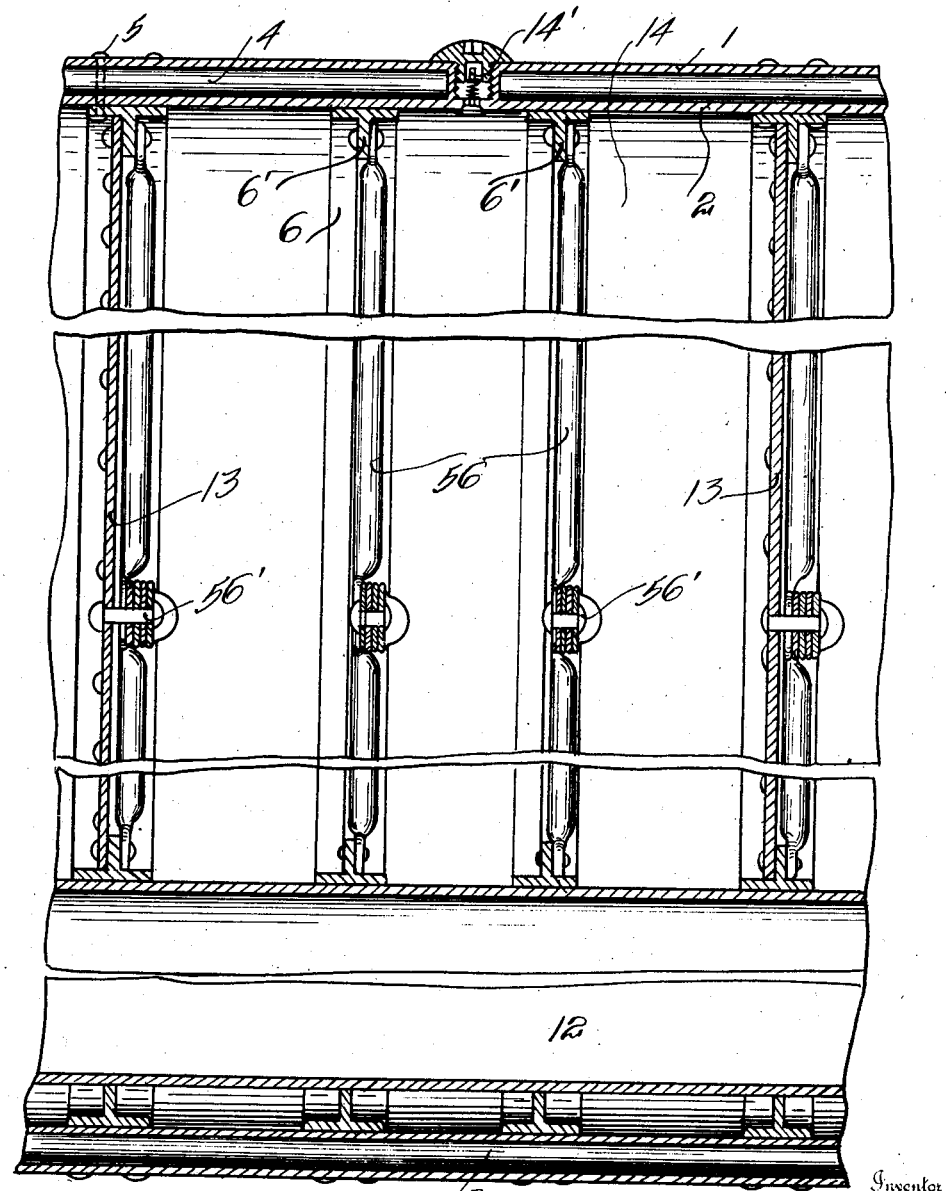

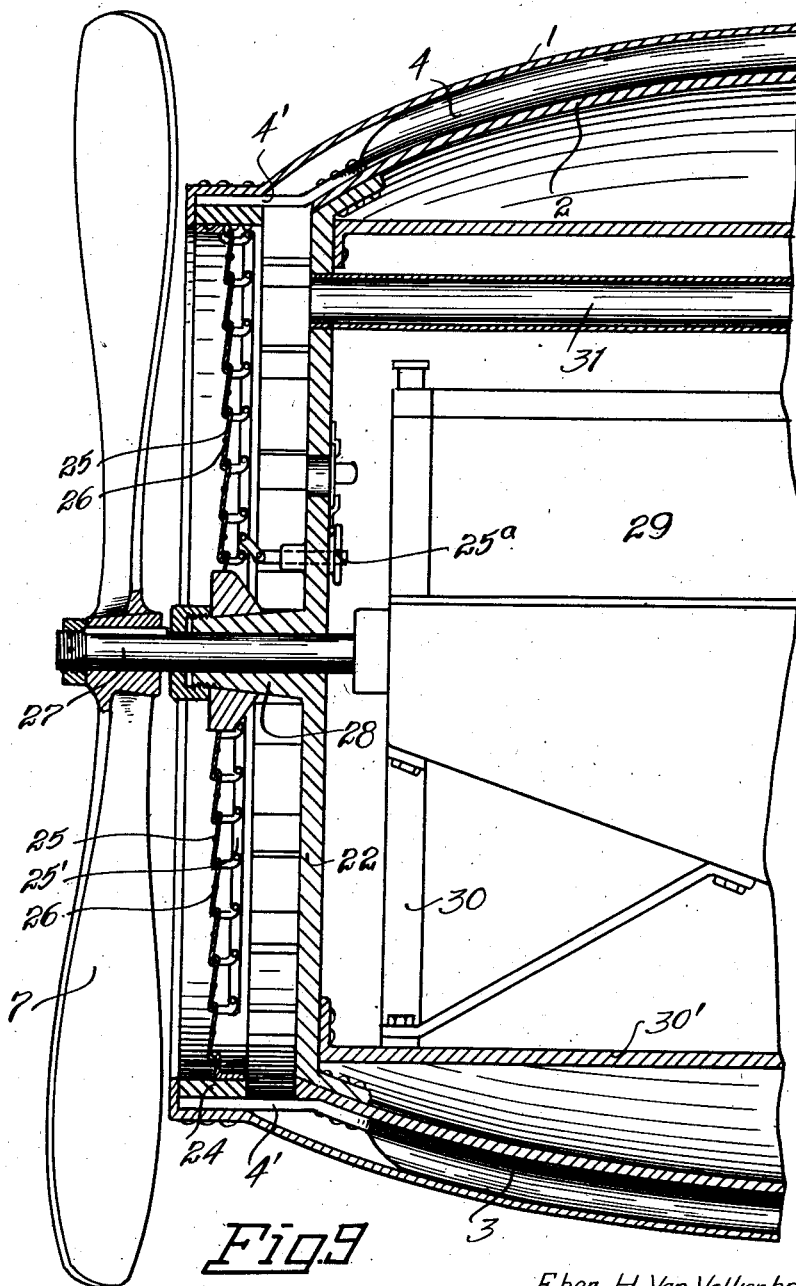

Patented Apr. 13, 1926.

1,580,182

UNITED STATES PATENT OFFICE.

EBER H. VAN VALKENBERG, OF MONROE, WASHINGTON, ASSIGNOR OF ONE-FOURTH TO OSCAR SILVERSTEIN, OF SPOKANE, WASHINGTON.

DIRIGIBLE AIRSHIP.

Application filed April 27, 1925. Serial No. 26,078.

*To all whom it may concern:*

Be it known that I, EBER H. VAN VALKENBERG, a citizen of the United States, residing at Monroe, in Snohomish County and State of Washington, have invented certain new and useful Improvements in Dirigible Airships, of which the following is a specification.

My present invention relates to improvements in airships of the dirigible balloon or lighter than air type, and is designed for the purpose of embodying in this class of aircraft certain structural arrangements and features whereby the craft may be maneuvered with facility; the parts of the structure are properly braced to insure safety and durability; and necessary ventilation is afforded.

The invention involves the utilization of a dirigible aircraft having separate compartments or containers for buoyant gas with means for controlling the intake and outlet of gas to and from the compartments. A longitudinally movable gondola or car is carried by the aircraft and suspended in such manner that the car may be adjusted for maintaining the equilibrium of the craft for a straight course as well as for maneuvering to descend for a landing or ascending after launching. Means are provided for ventilating the aircraft for the purpose of maintaining the buoyant gas at a desired temperature, and other meritorious features are present in the invention as will hereinafter be more fully pointed out and claimed.

In the accompanying drawings I have illustrated combinations and arrangements of parts in the structure of the airship in which my invention is physically embodied according to the best mode I have thus far devised for the practical application of the principles of my invention.

Figure 1 is a view in side elevation of an aircraft embodying the features of my invention, the arrow pointing in the direction of travel of the ship.

Figure 2 is a transverse vertical sectional view of the craft at line 2—2 of Figure 1.

Figure 3 is a longitudinal vertical sectional view, enlarged, at the prow or bow of the ship.

Figure 8 is an enlarged longitudinal vertical sectional view of a portion of the craft showing the transverse plates or partitions forming gas compartments, and the transverse braces, and Figure 9 is a vertical longitudinal sectional view at the fore end of the ship.

Figures 4, 5:
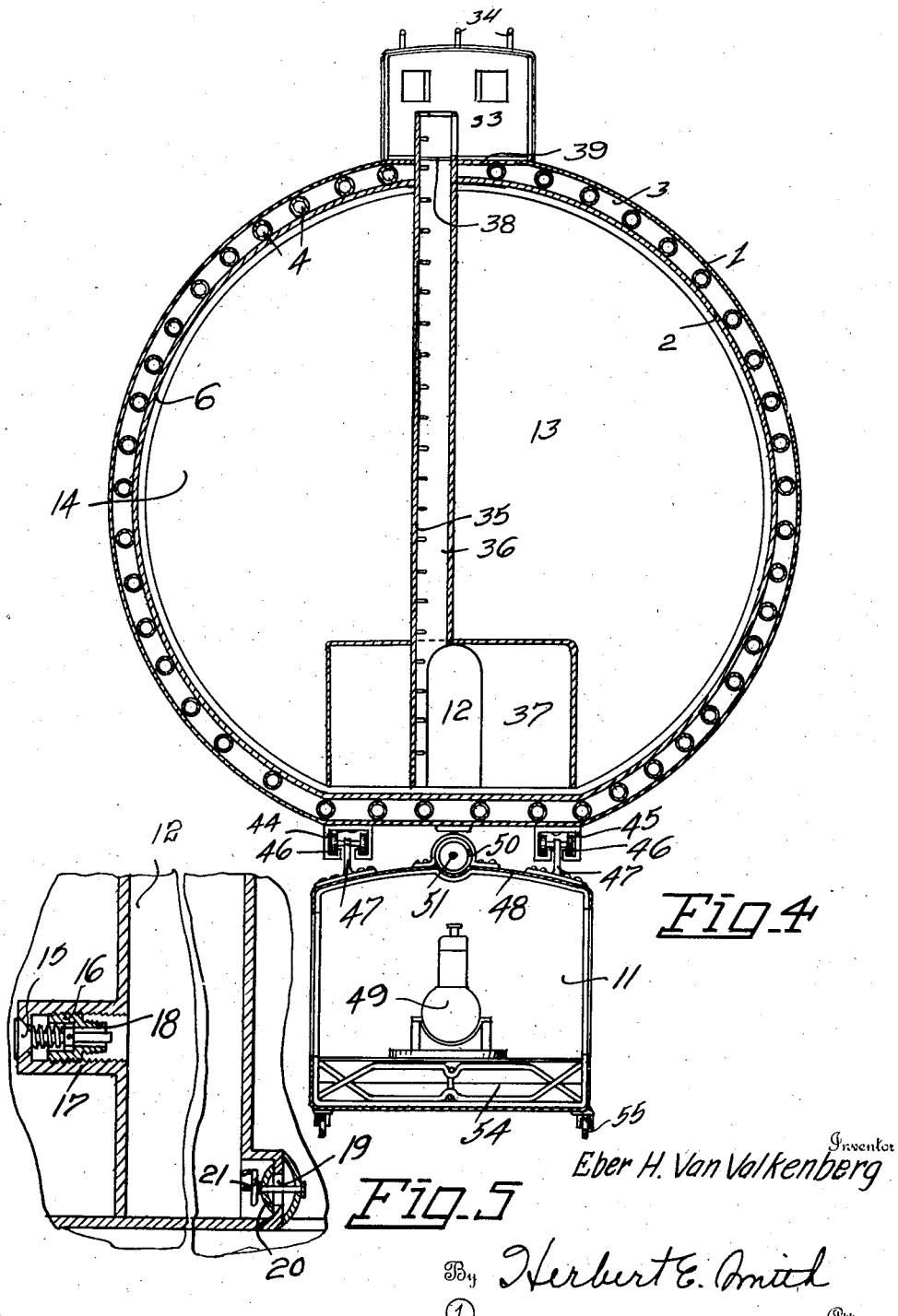
Figure 4 is a transverse vertical sectional view amidship as at line 4—4 of Figure 1.
Figure 5 is a detail sectional view transversely of the ship showing the intake and outlet valves for the gas compartments.

The aircraft which is of the standard dirigible-balloon shape is fashioned with a hull comprising an outer wall 1 and an inner wall 2, which are made up of suitable material, and form an air space 3 extending practically over the entire area of the hull of the craft. Within this air space are arranged a series of longitudinally extending tubular beams 4 arranged fore and aft of the ship in a circular series, and the double walls of the hull are fixed to these beams as by rivets or bolts 5. At the inner side of the inner wall of the ship are provided interior transversely arranged brace rings 6 spaced at suitable intervals throughout the length of the craft for maintaining the formation of the hull against both internal and external pressure.

The craft is equipped with a suitable number of propellers, here indicated as four in number with the fore and aft propellers 7 and 8 alined with the longitudinal axis of the air craft and fore and aft propellers 9 and 10 carried by the gondola or car 11 which is suspended beneath and carried by the ship for the accommodation of crew and passengers or freight.

A tunnel 12 is arranged along the keel line of the craft with upwardly inclined ways to the fore and aft engine houses to give access to the several parts of the craft, and the walls of this tunnel form a keelson or longitudinal brace in connection with a series of transversely arranged plates 13 spaced at suitable intervals through the length of the craft. The plates are circular in form and notched to fit around the walls of the tunnel or the keelson and form partitions secured to the annular or ring braces 6. Between adjoining partitions the gas compartments 14 are provided, each having an emergency valve 14' arranged in the hull of the ship and preferably upon its upper exterior deck as indicated in Figures 2 and 8.

The supply of gas is furnished to the several compartments from the tunnel or keelson by means of inwardly opening valves 15 in the tunnel wall and located near the keel of the ship. Each valve has a plug 16 threaded into a casing 17 supported in suitable manner in the tunnel wall, and the plug is fashioned with an attaching nipple 18 to which the supply pipe or hose may be applied for filling the compartment. As the gas is admitted to the interior of the compartment, air if present in the compartment is disposed of through an outlet 19 in the wall of the tunnel (Fig. 5) located at a lower point than the intake valve 15 and nearer the keelson or keel of the craft, to materially assist in disposing of the air which is heavier than the admitted gas. An outlet or air valve 20 is used to close the opening 19 and a control wheel 21 is provided for the valve which wheel is accessible for use from the interior of the tunnel 12.

The fore and aft ends of the aircraft are provided with a circular bow-plate 22 and a similar stern-plate 23, the latter shown in dotted lines in Figure 1 and the former shown best in section in Figures 3 and 9. Exterior of these plates is arranged a ring 24 fixed within the open end of the outer wall of the hull for reinforcing and bracing the structure. Each of these rings, as indicated in connection with the bow-ring 24 in Figures 3 and 9, is provided with a ventilating device which includes a series of adjustable slats or shutters 25 disposed horizontally of the aircraft and supported in the ring on horizontal pivots 26. By means of a shutter rod 25' which is arranged in vertical position and pivotally connected or hinged to each shutter or slat, the slats may be adjusted on their pivots to vary the area of the opening in front of the bow-plate 22 and control admission of air currents to the air space 3 between the double walls of the hull. A control device 25ª supported in the bow-plate as seen in Figure 9 may be manipulated from the interior of the ship for regulating these slats and for entirely opening or entirely closing the ventilating device as a whole.

It will be apparent that with the adjustable shutters or slats open and the ship under way air currents may be admitted to the annular air space between the double walls of the hull for the purpose of either lowering the temperature of the gas in the compartments, or raising the temperature of the gas, under proper conditions.

The shaft 27 of the propeller 7 is journalled in a bearing boss 28 of the bow plate 22, and the propeller may be utilized to pass air currents through the ventilating device if required. A standard type of engine or motor 29 is used to drive the propeller and engine frame 30 is supported on a platform or engine deck 30' at the bow or prow of the craft as indicated in Figure 9.

In addition to the use of natural or forced draft of air currents for the annular air space 3, a hot air pipe 31 leading from a heat generator 32 may be employed. The generator and hot air pipe are preferably located in the engine house and supported from the deck or platform 30', and it will be apparent that with the adjustable ventilator in the bow of the craft closed, heated air currents from the generator 32 may be conveyed by way of the hot air pipe 31, to the space back of the ventilator device and in front of the bow-plate, and from there the heated air currents will pass to the annular space 3. From this space the heat is radiated through the interior wall of the hull to the gas contained in the compartments for raising the temperature of the gas.

On the roof or upper deck of the aircraft a signal tower or cabin 33 is built for the accommodation of officers and crew, and supports 34 for antennæ of radio equipment are provided on the roof of the cabin. The interior of the cabin is reached from the interior of the keelson or tunnel by way of a vertical ladder 35 in a tubular structure or hatchway 36 located amidship and opening into a cabin 37 in the interior of the hull and intercepting the tunnel or keelson 12. A trap door or hatch 38 is located at the upper end of the hatchway flush with the deck 39 of the cabin 33, which when opened on its hinges gives access to the interior of the cabin 33.

For maneuvering the craft while under way a set of steering blades or planes 40, 41 and 42 are hinged at 43 and located exterior of the hull for manipulation or actuation from the interior of the ship. A pair of planes 40 are adjustable laterally on their vertical hinges for steering the craft to port or starboard, and the planes 41 and 42 respectively are used for causing an ascension when launching or a descent when landing the ship. These four planes are located at diametrical points about the longitudinal central axis of the craft and are adjustable toward or from the hull of the ship in manner well understood.

The gondola or car 11 which is suspended below and along the line of the keel of the ship is longitudinally movable with relation to the ship for tilting the craft on its horizontal axis and for this purpose the car may be shifted toward the bow or toward the stern of the craft.

A pair of tubular parallel tracks or ways 44 are spaced equidistant at the sides of the keel line and secured to the hull of the ship in suitable manner. Within these longitudinally extending tracks are carried two series of two-wheel trucks 45 and 46 having hangers 47 which are secured in suitable manner to the roof structure 48 of the car 11 for suspending the car from the craft. Suitable mechanism may be provided for positively shifting or changing the position of the car with relation to the craft, and in the drawings I have indicated a motive fluid motor or engine 49 carried within the car which furnish motive fluid to a pair of longitudinally alined cylinders 50 secured in proper manner on the roof structure 48. A pair of opposed piston rods 51 and 52 are provided with pistons in these cylinders, and the ends of these rods extended fore and aft of the ship are hinged or pivotally anchored at 53 to the hull of the ship. It will be obvious that when motive fluid is supplied to one cylinder and withdrawn from the other cylinder, the power in the first cylinder will be exerted on its piston, which is stationary, to relatively move the car longitudinally of the ship. In this manner the equilibrium or an even keel of the ship may be maintained if and when the load of the ship is shifted or the bow of the ship may be elevated or lowered for ascension or descent of the ship.

For ballasting the ship I employ a water-ballast tank 54 carried below the car and means are provided for filling the tank with water as well as means for emptying or disposing of the water ballast as required. For landing purposes a suitable number of wheels 55 are carried beneath the tank and distributed in proper location for support of the aircraft if a landing on the ground is required.

Figure 6:
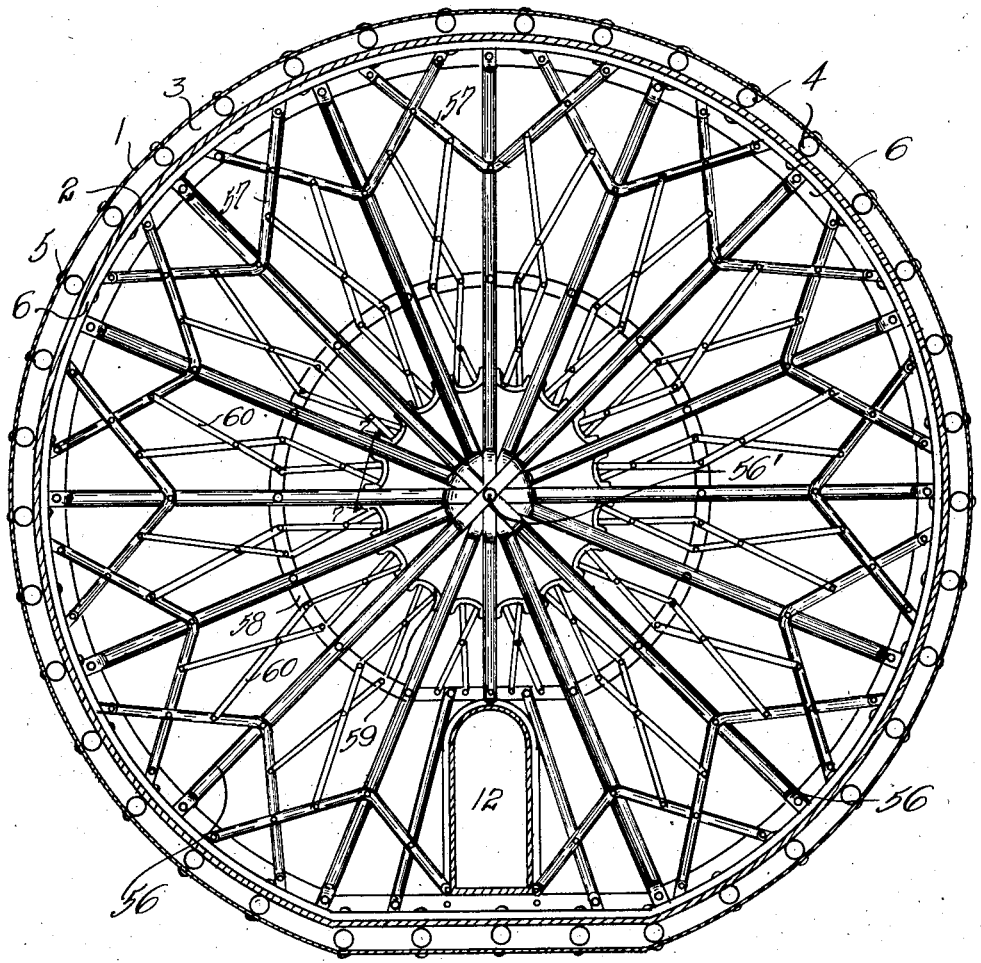
Figure 6 is an enlarged vertical sectional view transversely of the ship illustrating the spaced transverse braces for the double-wall hull.
Figure 7:
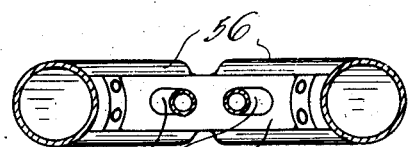
Figure 7 is an enlarged detail of the braces as at line 7—7 of Figure 6.

In Figure 6 the arrangement of the interior structural braces of the hull is shown, wherein the transversely arranged or diametrical braces 56 are centered on the longitudinal axis of the craft to form open, transversely disposed frames with a central securing bolt or rivet 56′. These open or skeleton frames are of circular shape and at their peripheries are bolted or riveted to the brace rings 6. The main braces 56 which are of tubular formation as seen in Figure 7 radiate from the center 56′ toward the double wall of the hull, and each brace 56 is provided with a V-shaped brace 57 with its ends riveted or bolted to the flange 6′ of a ring 6. The V-shaped hull-braces 57 it will be observed in Figure 6 overlap one another and by this arrangement of parts the skeleton frames are secured at comparatively close intervals around the circumference of the brace ring to insure a strongly reinforced skeleton frame for withstanding both internal and external pressure on the hull.

A smaller brace ring 58 concentric with the main brace ring 6 is also used in connection with these skeleton frames forming an intermediate circular brace and between this intermediate circular brace and the center of the skeleton frame another concentric structure is formed by the annular series of curved or angular plates 59, each of which plates is located between a pair of adjoining, converging main brace rods 56 and bolted or riveted thereto. From this annular series of brace plates rigid toggle braces 60 radiate outwardly and are riveted or bolted to the intermediate ring 58 with their ends riveted or bolted to the V-shaped hull braces 57. These transversely arranged skeleton, or spider frames, as seen in Figure 8, together with the rigid partitions or plates 13 which form the gas compartments, brace the hull structure in all radial directions from the longitudinal center of the hull. The longitudinal beams 4, as seen in Figure 9, at their flattened ends 4′ are connected fore and aft of the ship to the brace rings 24 and to the two walls of the hull thus reinforcing the hull structure against longitudinal strains.

From the above description taken in connection with my drawings it will be evident that I have provided a well braced structure for an aircraft and provided the craft with means whereby the maximum efficiency may be secured in maneuvering or while under way, as well as in landing or launching.

Having thus fully described my invention what I claim as new and desire to secure by Letters Patent is—

1. An aircraft having a double-wall hull forming an air space and a bow-plate closing the interior wall of the hull, and adjustable ventilating means exterior of the bow-plate for regulating the passage of air currents to said space.

2. An aircraft having a double-wall hull forming an air space, a bow-plate closing the interior wall of the hull, a bow-ring fixed in the outer wall exterior of the bow plate, a series of ventilating slats pivoted in said ring, and means for adjusting said slats.

3. An aircraft having a double-wall hull forming an air space, a bow-plate closing the inner wall of said hull, a propeller shaft having a journal bearing in said bow plate, a propeller and a motor for said shaft, and a ventilating device located between the propeller and bow-plate for regulating admission of air currents to said space.

4. An aircraft having a double-wall hull forming an air space and a series of spaced longitudinally extending beams in said space, a bow-plate closing the inner wall of the hull and means for securing said beams to said plate, a series of transversely arranged plates forming gas compartments within the inner wall, and means for controlling the entrance and exit of gas to and from said compartments.

5. An aircraft having a double-wall hull and a series of longitudinally extending beams between said walls, a bow-plate and means for attaching said beams to said plate, a series of transverse plates forming gas compartments in the inner wall of the hull, and a plurality of skeleton frames transversely arranged in said compartments.

6. An aircarft including its hull and a series of longitudinally extending beams, a bow-plate and means for attaching said beams to said plate, a series of plates forming transverse partitions within said hull, a longitudinally extending keelson forming a tunnel in said hull and intersecting said plates, and means supported in the keelson for controlling admission and exit of gas to the compartments formed between said plates.

7. An aircraft having a hull and longitudinally extending beams, a series of brace rings transversely disposed within the hull, a series of skeleton frames attached to said rings, each said frame comprising radiating rods, V-shaped braces at the ends of said rods connected to said rings, radial braces extending inwardly from said V-shaped braces, and an annular series of brace plates between adjoining radiating rods to which said inwardly extending braces are connected.

In testimony whereof I affix my signature.

EBER H. VAN VALKENBERG.